US012612979B1

(12) United States Patent
Ziehm et al.

(10) Patent No.: US 12,612,979 B1
(45) Date of Patent: Apr. 28, 2026

(54) BEAM CLAMP

(71) Applicants:Matthew Ziehm, Chesterfield, MI (US); Matthew Knybel, Clinton Township, MI (US)

(72) Inventors: Matthew Ziehm, Chesterfield, MI (US); Matthew Knybel, Clinton Township, MI (US)

( * ) Notice: Subject to any disclaimer, the term of this patent is extended or adjusted under 35 U.S.C. 154(b) by 0 days.

(21) Appl. No.: 18/793,830

(22) Filed: Aug. 4, 2024

(51) Int. Cl.
  F16L 3/00 (2006.01)
  F16M 13/02 (2006.01)

(52) U.S. Cl.
  CPC .............. F16L 3/00 (2013.01); F16M 13/02 (2013.01)

(58) Field of Classification Search
  CPC .... F16L 3/00; F16L 3/24; F16L 3/245; F16M 13/02; F16B 2/20
  USPC ... 248/72, 228.1, 228.2, 228.7, 216.4, 217.3
  See application file for complete search history.

(56) References Cited

U.S. PATENT DOCUMENTS

| | | | | | |
|---|---|---|---|---|---|
| 2,609,582 | A | * | 9/1952 | Kindorf | E04B 9/18 |
| | | | | | 403/387 |
| 3,131,447 | A | * | 5/1964 | Tinnerman | F16L 3/24 |
| | | | | | 248/300 |
| 3,276,800 | A | * | 10/1966 | Loudon | F16L 3/24 |
| | | | | | D8/394 |
| 4,505,010 | A | * | 3/1985 | Arenhold | F16B 2/245 |
| | | | | | 267/74 |
| 5,797,573 | A | * | 8/1998 | Nasu | H02G 3/32 |
| | | | | | 248/228.2 |
| 6,572,057 | B1 | * | 6/2003 | Roth | F16L 3/133 |
| | | | | | 248/62 |
| 8,038,106 | B2 | * | 10/2011 | Magno, Jr. | H02G 3/32 |
| | | | | | 248/65 |
| 8,157,185 | B2 | * | 4/2012 | Reichle | E01B 26/005 |
| | | | | | 238/338 |
| 9,206,927 | B2 | * | 12/2015 | Carter | F16L 3/243 |

* cited by examiner

*Primary Examiner* — Anita M King
(74) *Attorney, Agent, or Firm* — Robert M. Miller, PLLC

(57) ABSTRACT

A beam clamp includes a first end and a second end. The first end may be configured to grasp a structural member of a building. The second end may be configured to allow attachment of a clamp device configured to grasp at least one of a conduit, a pipe, a cable, and an object. The beam clamp is generally configured to be inserted around existing objects attached to the structural member of the building and enable attaching the at least one of the conduit, the pipe, the cable, and the object to the structural member of the building and avoid interference with the existing objects.

20 Claims, 9 Drawing Sheets

<u>FIG. 1</u>

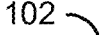
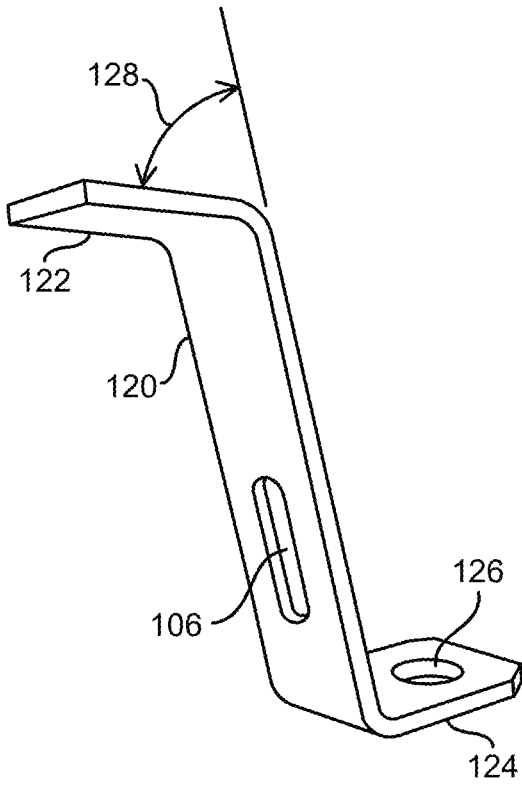
FIG. 3

200

200

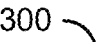
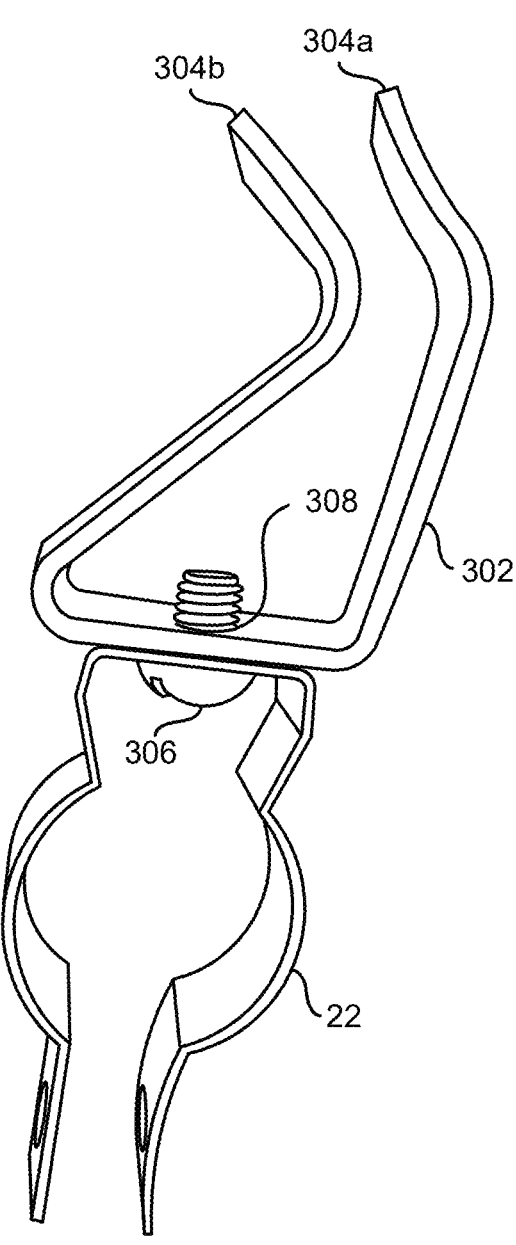
FIG. 7

BEAM CLAMP

FIELD OF THE INVENTION

The invention relates to a support and anchoring system for utility conduits generally and, more particularly, to a method and/or apparatus for implementing a beam clamp.

BACKGROUND

Commercial and industrial buildings, factories and structures are constructed with metal structural members, such as steel I-beams and metal roof trusses. Different trades, such as electricians, plumbers, fire suppression, HVAC, etc., use the I-beams and roof trusses to support various pipes, conduits, and other necessary equipment and materials. The different trades run out of physical space on these I-beams and roof trusses. The I-beams and roof trusses become overcrowded and filled up with different types of pipes, conduits, and materials. Existing clamps and supporting brackets only allow three positions (up, down, straight out) to place a clamp or supporting device.

Industrial establishments, commercial buildings, and industrial structures are constantly expanding their operations, adding new equipment and machines, and moving machines and equipment throughout these facilities and structures. Ever more pipes, conduits, materials, and equipment are required to be added onto the already utilized I-beams and roof trusses. The existing clamps do not allow sufficient space to allow additional supporting devices (i.e., clamps) to be installed onto the I-beams and roof trusses without affecting, and possibly compromising, existing installations.

It would be desirable to implement a beam clamp for use in locations already occupied by pipes, conduits, and/or other materials.

SUMMARY

The invention concerns a beam clamp includes a first end and a second end. The first end may be configured to grasp a structural member of a building. The second end may be configured to allow attachment of a clamp device configured to grasp at least one of a conduit, a pipe, a cable, and an object. The beam clamp is generally configured to be inserted around existing objects attached to the structural member of the building and enable attaching the at least one of the conduit, the pipe, the cable, and the object to the structural member of the building and avoid interference with the existing objects.

BRIEF DESCRIPTION OF THE FIGURES

Embodiments of the invention will be apparent from the following detailed description and the appended claims and drawings.

FIG. 3 is a diagram illustrating a clamping member of the beam clamp of FIG. 2.

FIG. 7 is a diagram illustrating an example implementation of the beam clamp of FIG. 6.

DETAILED DESCRIPTION OF THE EMBODIMENTS

Embodiments of the present invention include providing a beam clamp that may (i) be installed without removing existing installations, (ii) be installed through gaps in existing installations, (iii) be inexpensive to manufacture, (iv) utilize unused space on a beam, roof truss, or structural member, (v) maximize useful space on a beam, roof truss, or structural member, (vi) add useful space on an otherwise overcrowded or fully-utilized structural member, (vii) make conduit installations appear neater, (viii) allow code compliance of conduit supports, (ix) make conduit runs shorter and less complicated to install, (x) make conduit runs less expensive to install, and/or (xi) be installed quickly.

In various embodiments, the invention relates to a system, device and method for quickly and inexpensively supporting and securing multiple utility objects, including, for example, cables, pipes, conduits, and other utility lines, to building structural members such as I-beams, H-beams, T-bars, and other planar or curved structural members with existing installations where building structural members are already full of existing cables, pipes, conduits, and other objects. In various embodiments, beam clamps are provided that allow the mounting of the multiple utility objects, including, for example, cables, pipes, conduits, and other utility lines, to the building structural members around the existing installations without disturbing the existing installations. In an example, beam clamps are provided that allow the mounting of the multiple utility objects, including, for example, cables, pipes, conduits, and other utility lines, to the building structural members complete full of existing pipes, conduits, and cables.

Figure 1:
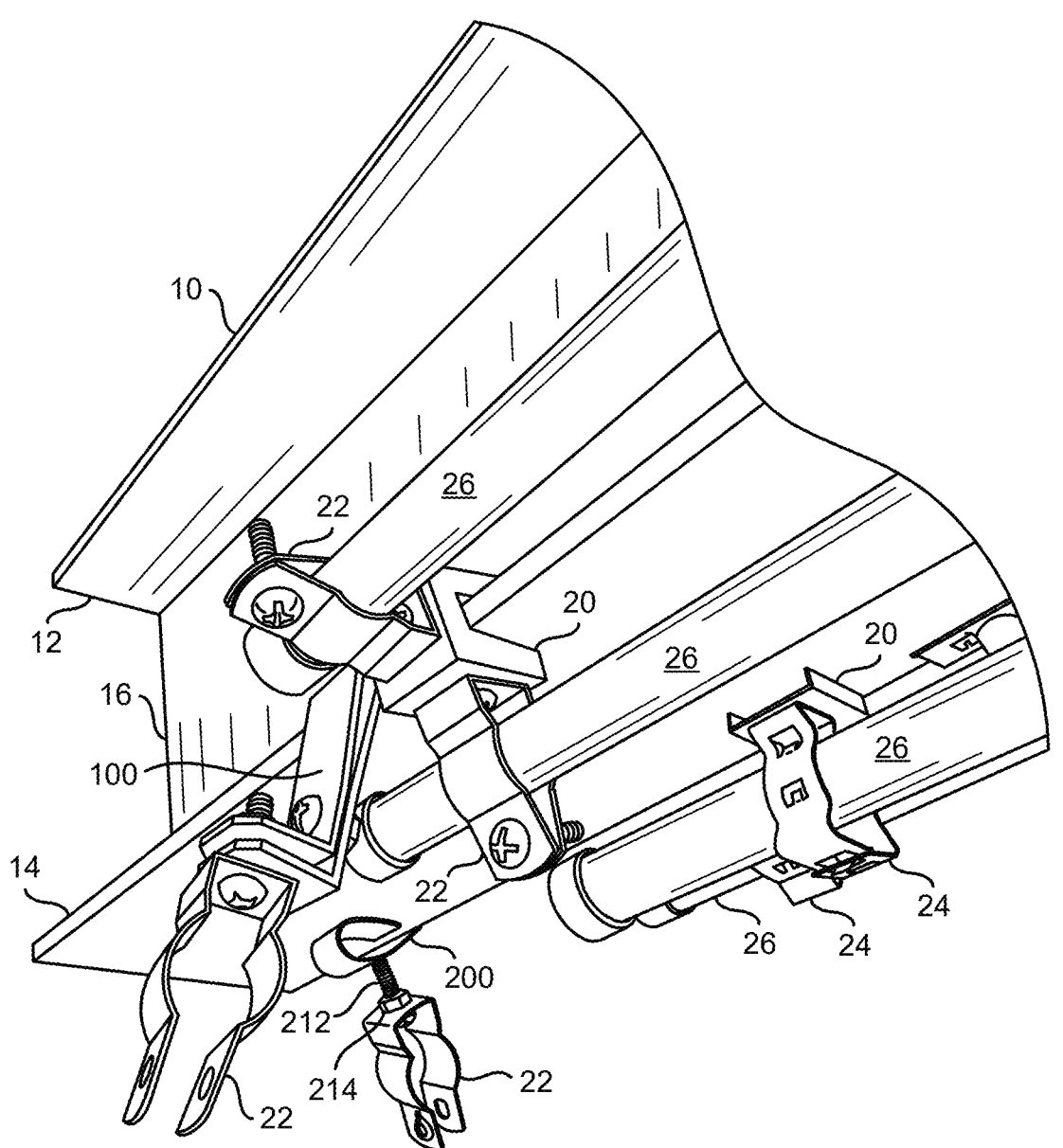
FIG. 1 is a diagram illustrating an application context of beam clamps in accordance with example embodiments of the invention.

Referring to FIG. 1, a diagram is shown illustrating a perspective view exemplifying application of a beam clamp in accordance with an example embodiment of the invention. In an example, an I-beam 10 is shown exemplifying a structural member of a building. In an example, the I-beam 10 generally comprises an upper flange 12 and a lower flange 14 connected by a web 16. In existing techniques, conventional beam clamps 20 are attached to outer edges of the flange 14. In an example, conduit securing members 22 and 24 attached to the conventional beam clamps 20 are used to secure utility conduits 26 to the I-beam 10. As illustrated in FIG. 1, the conventional method currently used suffers from limitations with respect to the number of utility conduits 26 that can be secured and limited positions and directions in which the utility conduits 26 can be mounted. In addition, once the utility conduits 26 are mounted on the flanges 14 of the I-beam 10, the utility conduits 26 interfere with (or prevent) mounting of additional utility conduits 26 using additional conventional beam clamps 20.

In an example, a beam clamp 100 in accordance with an embodiment of the invention may be inserted between existing objects (e.g., the utility conduits 26) mounted on the flange 14 of an I-beam 10 and mounted onto the flange 14 of the I-beam 10 of the building. In an example, a conduit securing member 22 may be mounted onto the beam clamp 100 to provide support for additional objects (e.g., conduit(s), pipe(s), cable(s), etc.). In an example, the conduit securing member 22 may be attached to the beam clamp 100 by a first bolt and a first nut. In an example, a second bolt and a second nut (not shown) may be used to attach legs of the conduit securing member 22 to the additional objects (e.g., conduit(s), pipe(s), cable(s), etc.) to be supported. In another example, the second bolt may be passed through a hole in a distal end of first leg of the conduit securing member 22 and threaded into a speed nut implemented in a distal end of a second leg of the conduit securing member 22.

In various embodiments, beam clamps 100 in accordance with an embodiment of the invention may be implemented having various lengths and/or angles that allow the beam clamps 100 to be inserted through existing objects and clamped onto the flange 14 of the I-beam 10. The various lengths and angles of the beam clamps 100 may be further configured to ensure objects supported by the beam clamps 100 do not interfere (e.g., come in contact) with the existing objects. In various embodiments, the beam clamps 100 in accordance with an embodiment of the invention may be mounted to the flange 14 of the I-beam 10 to position the conduit securing member 22 above, below, or around existing objects already mounted to the I-beam 10. In various embodiments, the beam clamp 100 in accordance with an embodiment of the invention may be mounted securely to the flange 14 without needing access to an end of the bar clamp 100 in contact with the flange 14.

In another example, a spiral beam clamp 200 in accordance with an embodiment of the invention may be inserted between existing objects (e.g., the utility conduits 26) mounted on the flange 14 of the I-beam 10 and mounted onto the flange 14 of the I-beam 10 of the building. In an example, a conduit securing member 22 may be mounted onto the beam clamp 200 (e.g., by a bolt 212) to provide support for additional objects (e.g., conduit(s), pipe(s), cable(s), boxes, etc.). In an example, the conduit securing member 22 may be attached to the beam clamp 200 by a first bolt and a first nut. In an example, a second bolt and a second nut (not shown) may be used to attach legs of the conduit securing member 22 to the additional objects (e.g., conduit(s), pipe(s), cable(s), etc.) to be supported. In another example, the second bolt may be passed through a hole in a distal end of first leg of the conduit securing member 22 and threaded into a speed nut implemented in a distal end of a second leg of the conduit securing member 22.

In various embodiments, beam clamps 200 in accordance with an embodiment of the invention may be implemented having various angles that allow a bolt attached to the beam clamps 200 to extend through existing objects while the beam clamps 200 are clamped onto the flange 14 of the I-beam 10. The various angles of the beam clamps 200 may be further configured to ensure objects supported by the beam clamps 200 do not interfere (e.g., come in contact) with the existing objects. In various embodiments, the beam clamps 200 in accordance with an embodiment of the invention may be mounted to the flange 14 of the I-beam 10 to position the conduit securing member 22 above, below, or around existing objects already mounted to the I-beam 10. In various embodiments, the beam clamp 200 in accordance with an embodiment of the invention may be mounted securely to the flange 14 without needing access to an end of the beam clamp 200 in contact with the flange 14.

Figure 2:
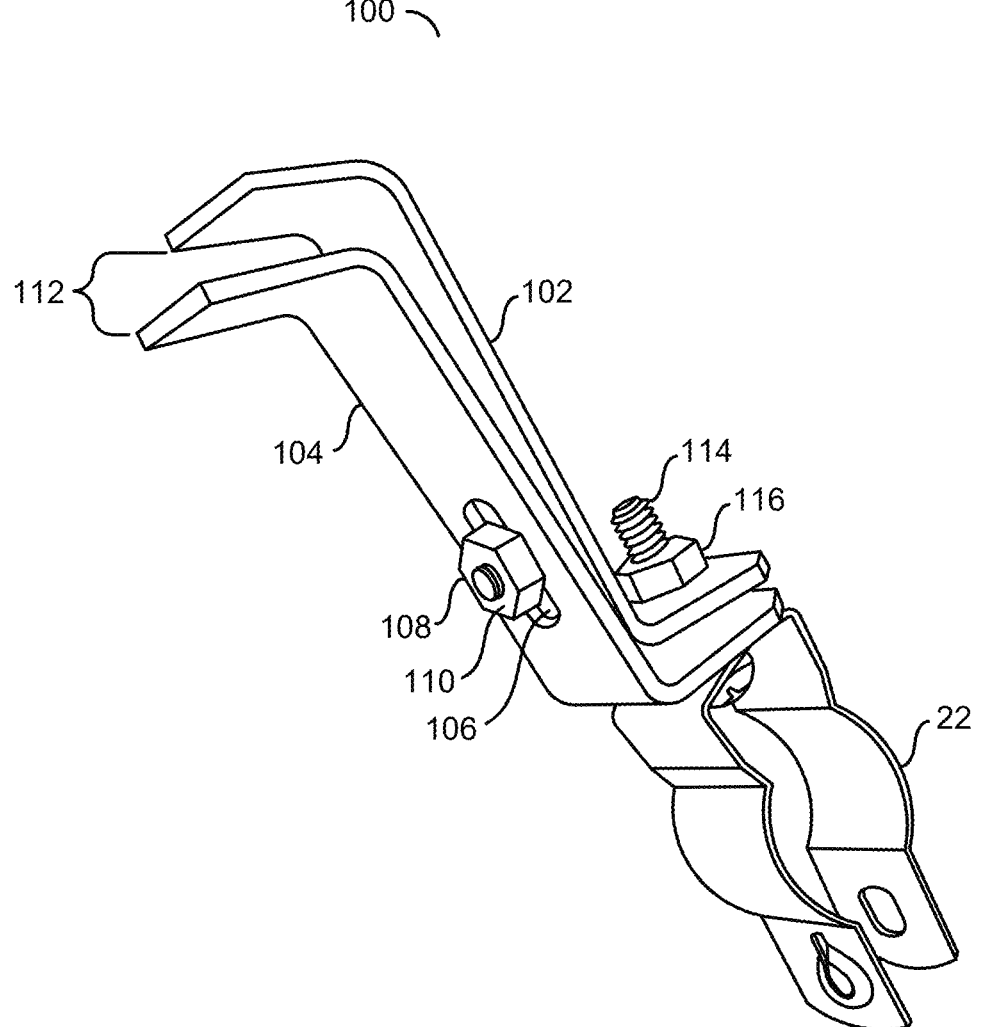
FIG. 2 is a diagram illustrating an example implementation of a beam clamp in accordance with an example embodiment of the invention.

Referring to FIG. 2, a diagram is shown illustrating an example implementation of a beam clamp in accordance with an example embodiment of the invention. In an example, the beam clamp in accordance with an embodiment of the invention may comprise a first beam member 102 and a second beam member 104. The first beam member 102 and the second beam member 104 may define openings 106. A first fastener 108 may be passed through the openings 106 and secured by a first nut 110. In an example, the openings 106 may be elongated to allow adjustment of the first beam member 102 and the second beam member 104 relative to each other. A first end of the first beam member 102 and a first end of the second beam member 104 may be bent at an angle to a central portion of the first beam member 102 and the second beam member 104, respectively. The first end of the first member 102 and the first end of the second beam member 104 may be configured to cooperate to form a gap 112. The gap 112 may be configured to fit onto a portion (e.g., flange or web) of a building structural member. The first fastener 108 and the nut 110 may be configured to draw the first beam member 102 and the second beam member 104 together to narrow the gap 112 to apply a clamping force to clamp the beam clamp 100 onto the flange or web of the structural member of the building. In an example, the first end of the first beam member the first end of the second beam member 104 may be configured such that the beam clamp 100 extends at a particular angle from the flange or web of the structural member of the building.

In an example, a second end of the first beam member 102 and a second end of the second beam member 104 may be bent at another angle to the central portion of the first beam member 102 and the central portion of the second beam member 104, respectively. The second end of the first member 102 and the second end of the second beam member 104 are generally bent in a direction opposite to the first end of the first beam member 102 and the first end of the second beam member 104, respectively. In an example, a second fastener 114 and a nut 116 may attach a clamp device 22 to the second end of the first beam member 102 and the second end of the second beam member 104. In an example, the second end of the first beam member 102 and the second end of the second beam member 104 may define openings through which the second fastener 114 may be passed, securing the clamp device 22 to the second end of the first beam member 102 and the second end of the second beam member 104. The clamp device 22 is generally configured to support at least one of a conduit, a pipe, and/or a cable. In an example, the clamp device 22 may be implemented using conventional techniques.

Referring to FIG. 3, a diagram is shown illustrating an example implementation of a beam member (e.g., first beam member 102) of the beam clamp 100 of FIG. 2. In an example, a piece of metal strap or bar stock 120 may have a first end 122 and a second end 124. A central portion of the bar stock 120 may define the opening (or hole) 106. In an example, the opening 106 may be positioned between the first end and the second end and closer to the second end 124. The second end 124 may define a second opening (or hole) 126, through which the second fastener 114 may be passed. In an example, the first end 122 may be bent to form an angle 128 to a plane of the central portion of the bar stock 120. In an example, the angle 128 may be selected to ensure the beam clamp may be attached to the structural member of a building while avoiding contact with existing objects attached to the structural member of a building.

Figure 4:
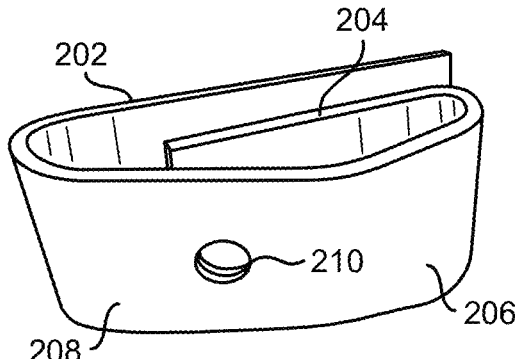
FIG. 4 is a diagram illustrating an example implementation of a spiral beam clamp in accordance with an example embodiment of the invention.

Referring to FIG. 4, a diagram is shown illustrating a beam clamp in accordance with another example embodiment of the invention. In an example, a metal (e.g., steel, etc.) strap or piece of bar stock may be folded to form the spiral beam clamp 200. In an example, the strap or bar stock may comprise a first end 202, a second end 204, a first central facet 206, and a second central facet 208. In an example, the strap or bar stock may be folded in a spiral such that the first end 202 of the metal strap is juxtaposed with the second end 204 of the metal strap. In an example, the strap or bar stock may be folded such that the first central facet 206 and the second central facet 208 are at angle to the first end 202 and the second end 204, and to one another. In an example, the central facet 208 of the metal strap 200 may further include (define) a threaded hole 210. The threaded hole 210 is generally positioned on an opposite side of the beam clamp 200 from the overlapping of the first end 202 of the metal strap 200 and the second end 204 of the metal strap 200. In some embodiments, a second thread hole 210 may be similarly implemented in (defined by) the central facet 206 of the beam clamp 200.

Figure 5:
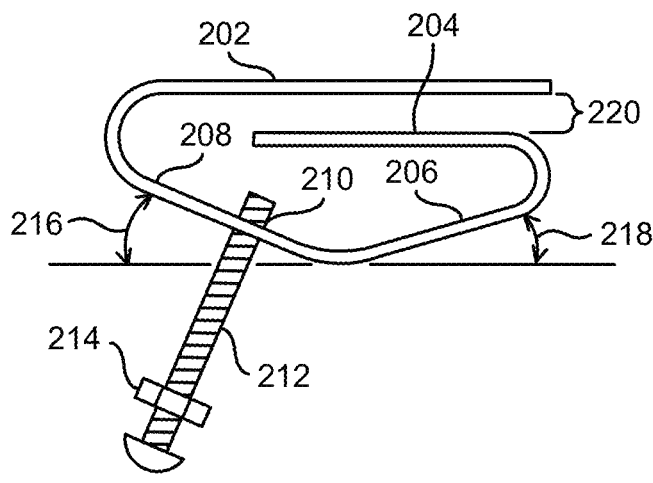
FIG. 5 is a diagram illustrating features of the spiral beam clamp of FIG. 4.

Referring to FIG. 5, a diagram is shown illustrating features of the beam clamp 200 of FIG. 4. In an example, the threaded hole 210 is generally positioned such that a bolt (or other threaded shaft) 212 screwed into the threaded hole 210 extends away from the spiral beam clamp 200 at an angle. The angle is generally configured to allow the bolt 212 to extend away from the spiral beam clamp 200 and through a gap between existing objects mounted on the flange of the structural member of the building. In an example, a nut 214 may be threaded onto the bolt 212 to attach a clamp device 22 to the beam clamp 200. In an example, the central facet 208 may be bent at an angle 216 relative to a plane of the first end 202, and the central facet 206 may be bent at an angle 218 relative to the plane of the first end 202. Various angles 216 and 218 may be implemented to meet design criteria of a particular application. In an example, multiple versions of the beam clamp 200 may be implemented having a variety of angles 216 and/or 218 to provide a choice of beam clamps 200 to apply in a particular situation.

In an example, the strap or bar stock of the beam clamp 200 may be folded in a spiral such that the first end 202 of the metal strap and the second end 204 of the metal strap and form a gap 220. The gap 220 is generally configured to fit over a flange or web of a structural member of a building by forcing the first end 202 of the metal strap 200 and the second end 204 of the metal strap 200 to spread apart. The strap or bar stock is generally configured such that the first end 202 of the metal strap 200 and the second end 204 of the metal strap 200 may then clamp onto the flange or web of the structural member of the building by a spring force of the folded (or coiled) metal strap. In an example, tightening the bolt 212 into the beam clamp 200 may cause additional clamping force to be applied on a structural member positioned between the first end 202 of the metal strap 200 and the second end 204 of the metal strap 200.

Figure 6:
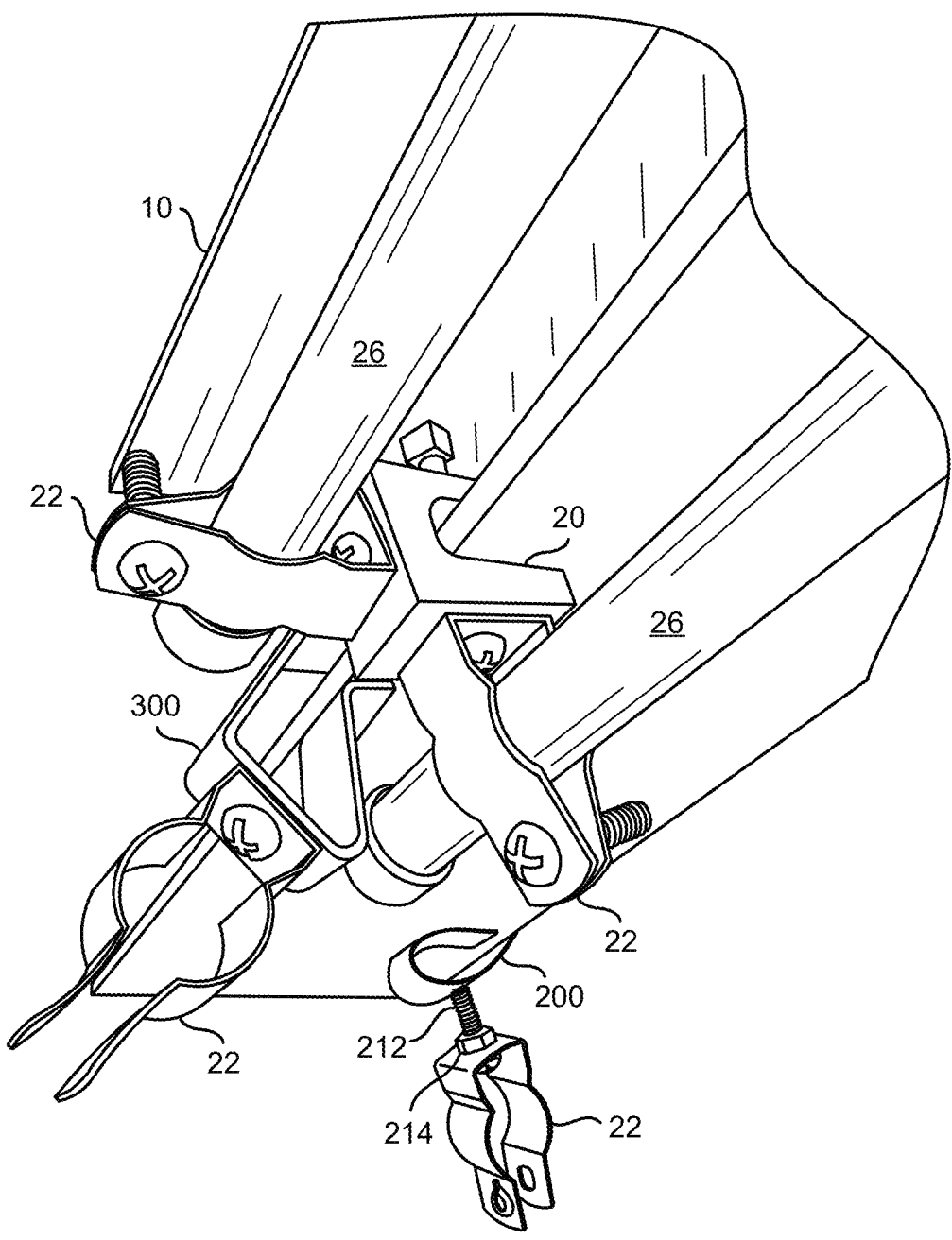
FIG. 6 is a diagram illustrating an application context of another beam clamp in accordance with an example embodiment of the invention.

Referring to FIG. 6, a diagram is shown illustrating an application of a beam clamp in accordance with another example embodiment of the invention. In an example, a beam clamp 300 in accordance with an embodiment of the invention may be inserted between existing objects (e.g., conduits 26) mounted on a flange of a structural member 10 of a building and mounted onto the flange of the structural member of the building. In an example, a clamping device 22 may be mounted onto the beam clamp 300 to provide support for additional objects (e.g., conduit(s), pipe(s), cable(s), etc.). In an example, the beam clamp 300 may comprise a folded beam member. In an example, the folded beam member may comprise a first end and a second end configured to clamp onto a flange the web of the structural member 10 of a building.

Referring to FIG. 7, a diagram is shown illustrating an example implementation of the beam clamp 300 of FIG. 6. In an example, the beam clamp 300 may comprise a folded beam member 302. In an example, the folded beam member 302 may be formed from a metal (e.g., steel, etc.) strap or piece of bar stock. In an example, the folded beam member 302 may comprise a first end 304a and a second end 304b. The first end 304a of the folded beam member 302 and the second end 304b of the folded beam member 302 are generally configured to form a gap. The gap is generally configured to be spread apart by pushing the folded beam member 302 onto a flange or web of a structural member of a building. The first end 304a of the folded beam member 302 and the second end 304b of the folded beam member 302 are generally configured to apply a clamping force to clamp the beam clamp 300 onto the flange of the structural member of the building. In an example, a center section of the folded beam member 302 may be configured to enable a clamp device 22, configured to support at least one of a conduit, a pipe, and a cable, to be attached to the center section of the folded beam member 302 by a fastener 306. In an example, the center section of the folded beam member 302 may comprise (or define) a threaded hole 308 into which the fastener 306 may be screwed.

Figure 8:
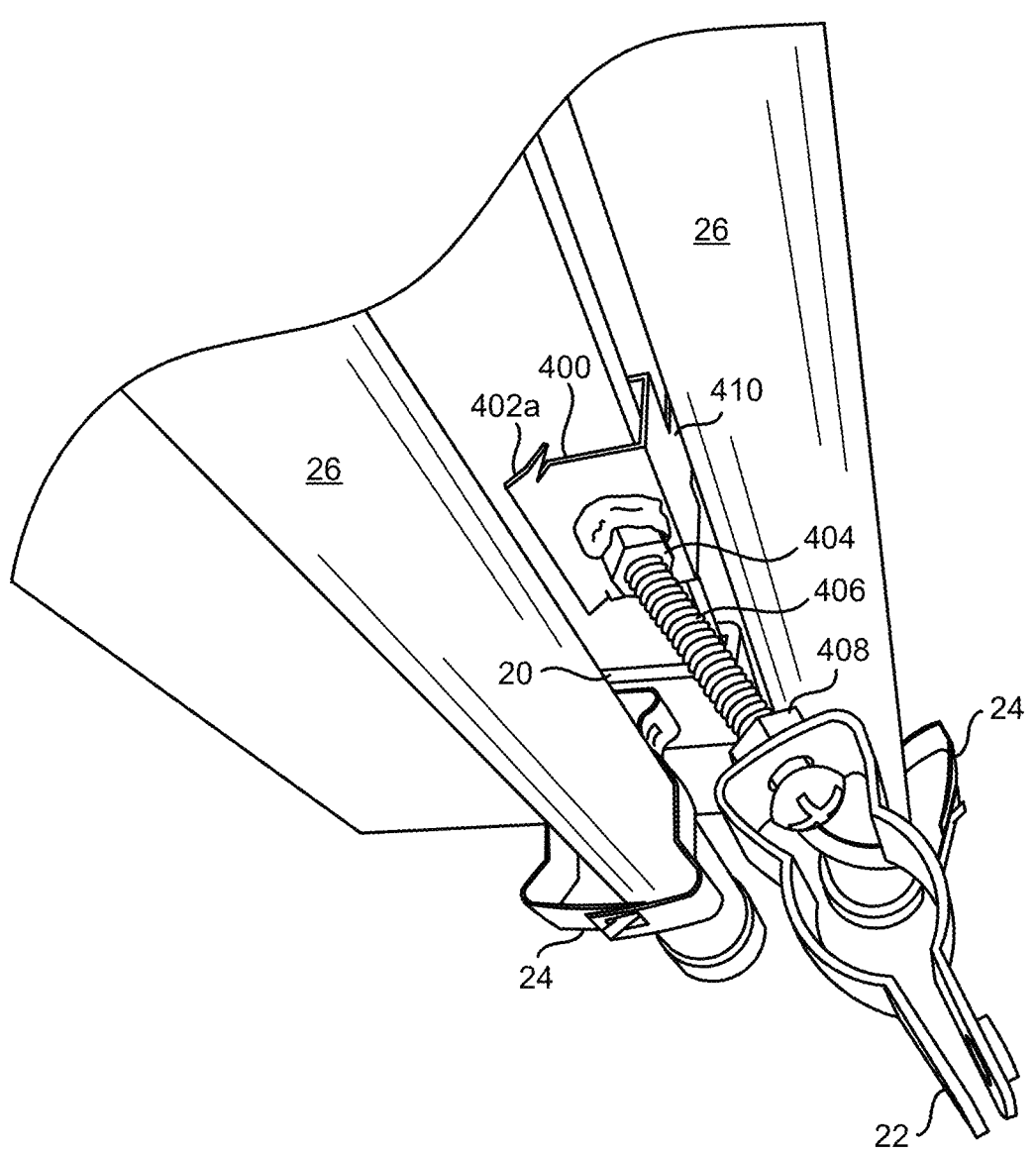
FIG. 8 is a diagram illustrating an application context of an F-shaped beam clamp in accordance with yet another example embodiment of the invention.

Referring to FIG. 8, a diagram is shown illustrating an application of a beam clamp in accordance with another example embodiment of the invention. In an example, a beam clamp in accordance with another example embodiment of the invention may comprise an F-shaped beam clamp 400. In an example, the F-shaped beam clamp 400 may comprise a first clamping member 402a, a second clamping member 402b (not visible), a third clamping member 402c (not visible), a threaded nipple (or connector) 404, a threaded bolt (or shaft) 406, a nut 408, and a tang 410 (hidden by a conduit 26). The F-shaped beam clamp 400 may be pushed onto a flange or web of a structural member of a building. The threaded bolt (or shaft) 406 may be inserted through a clamp device 22 and the screw 408 may screw onto the bolt (or shaft) 406 and tightened to secure the clamp device 22. The bolt (or shaft) 406 may then be screwed into the threaded nipple 404. In an example, the clamp 22 may be attached to the threaded bolt (or shaft) 406 between a head of the threaded bolt 406 and the nut 408. In an example, the F-shaped beam clamp 400 and the threaded bolt (or shaft) 406 are generally configured such that the threaded bolt (or shaft) 406 may pass between existing objects (e.g., conduits 26) already mounted on the flange or web of the structural member of the building.

Figure 9:
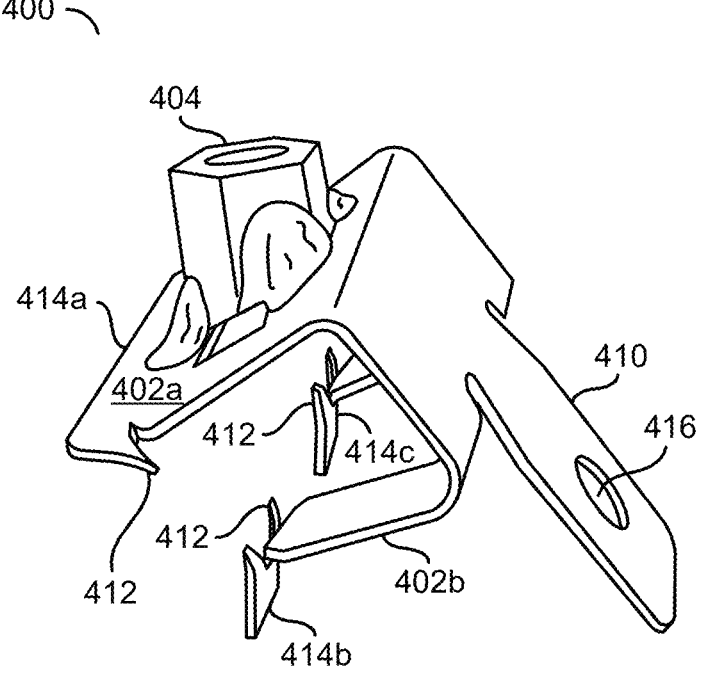
FIG. 9 is a diagram illustrating a side view of an example implementation of the F-shaped beam clamp of FIG. 8.

Referring to FIG. 9, a diagram is shown illustrating an example implementation of the beam clamp 400 of FIG. 8. In an example, the F-shaped beam clamp 400 may comprise a first clamping member 402a, a second clamping member 402b, a third clamping member 402c, a threaded nipple (or connector) 404, and a tang 410. In an example, the first clamping member 402a, the second clamping member 402b, and the third clamping member 402c may comprise a plurality of barbs 412. The barbs 412 are generally configured to bite into the flange or web of a structural member of a building when the F-shaped clamp 400 is pushed onto the flange of the structural member of the building, thus preventing the F-shaped clamp 400 from sliding off. In an example, an end 414*a* of the first clamping member 402*a*, an end 414*b* of the second clamping member 402*b*, and an end 414*c* of the third clamping member 402*c* may be bent at an angle to expose the barbs 412. In an example, the tang 410 may comprise (define) an opening 416. The opening 416 may be used to attach additional objects to the beam clam 400. In an example, the threaded nipple 404 may be welded onto an exterior surface of the first clamping member 402*a*.

Figure 10:
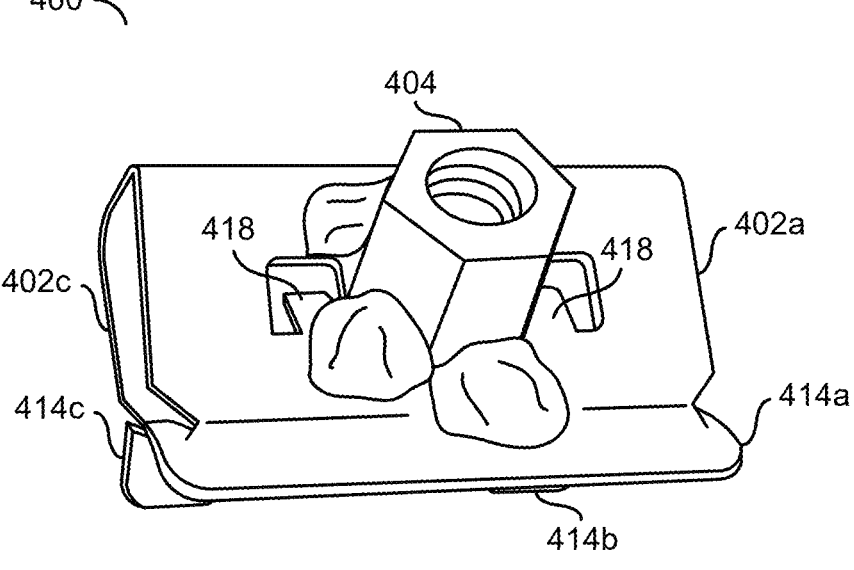
FIG. 10 is a diagram illustrating a top view of the F-shaped beam clamp of FIG. 9.

Referring to FIG. 10, a diagram is shown illustrating a top view of the beam clamp 400 of FIG. 9. In an example, the first clamping member 402*a* may comprise a pair of tabs 418 configured to provide additional clamping force on the flange or web of the structural member of the building. In an example, the tabs 418 may extend at an angle into a space between the first clamping member 402*a*, the second clamping member 402*b*, and the third clamping member 402*c*. In an example, a tab 418 may be positioned on each side of the threaded nipple 404. In an example, the pair of tabs 418 may be configured to help prevent the F-shaped beam clamp 400 from sliding off the flange or web of the structural member of the building.

Figure 11:
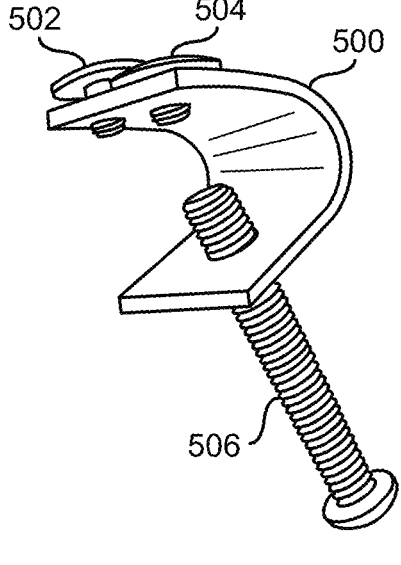
FIG. 11 is a diagram illustrating a beam clamp in accordance with still another example embodiment of the invention.

Referring to FIG. 11, a diagram is shown illustrating a beam clamp in accordance with another example embodiment of the invention. In an example, a beam clamp in accordance with another example embodiment of the invention may comprise a U-shaped metal (e.g., steel, etc.) strap 500. A first end of the U-shaped metal strap 500 may comprise a plurality of threaded holes. In an example, two threaded holes may be implemented. In an example, a first threaded fastener (or bolt) 502 may be screwed into a first threaded hole in the first end of the U-shaped metal strap 500, a second threaded fastener (or bolt) 504 may be screwed into a second threaded hole in the first end of the U-shaped metal strap 500, and a third threaded fastener 506 may be screwed into a third threaded hole in a second end of the U-shaped metal strap 500. In some embodiments, the ends of the threaded fasteners 502, 504, and 506 may be conical (or pointed or sharpened) to better ensure a solid connection with the building structure. The third threaded fastener 506 is generally longer than the first threaded fastener and the second threaded fastener 504.

Figure 12:
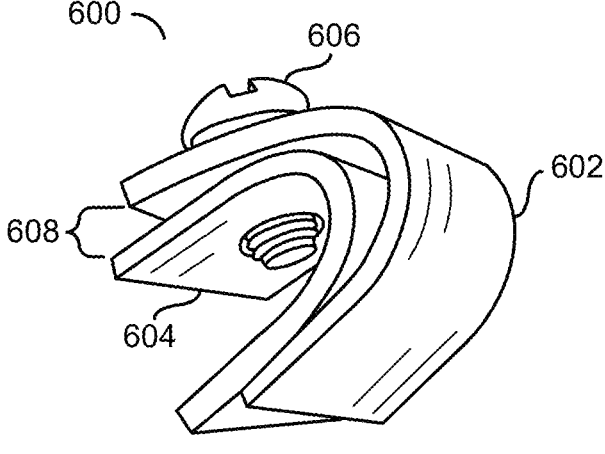
FIG. 12 is a diagram illustrating a beam clamp in accordance with another example embodiment of the invention.

Referring to FIG. 12, a diagram is shown illustrating a beam clamp 600 in accordance with another example embodiment of the invention. In an example, the beam clamp 600 may comprise a first U-shaped clamp member 602, a second U-shaped clamp member 604, and a fastener 606. The second U-shaped clamp member 604 is generally configured to fit within the first U-shaped clamp member 602. The fastener 606 generally passes through a hole in the first U-shaped clamp member and is threaded into a threaded hole in the second U-shaped clamp member 604. A curvature of the first U-shaped clamp member 602 and a curvature of the second U-shaped clamp member 604 are generally configured such that a first end of the first U-shaped clamp member 602 and a first end of the second U-shaped clamp member 604 form a gap 608 when the first U-shaped clamp member 602, the second U-shaped clamp member 604, and the fastener 606 are assembled together. In an example, the fastener 606 is generally inserted loose to allow the gap 608 to fit over a flange of a structural member of a building and then tightened to clamp the beam clamp 600 onto the flange of the structural member of the building.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or elements as "a"-"n", when used herein, disclose either a singular component, module and/or element or a plurality of such components, modules and/or elements, with the "n" designation applied to mean any particular integer number. Different components, modules and/or elements that each have instances (or occurrences) with designations of "a"-"n" may indicate that the different components, modules and/or elements may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A beam clamp comprising:
   a first end configured to grasp a structural member of a building; and
   a second end configured to allow attachment of a clamp device configured to grasp at least one of a conduit, a pipe, and a cable, wherein said beam clamp is configured to be inserted around existing objects attached to said structural member of said building, extend at an angle through said existing objects, and enable attaching said at least one of said conduit, said pipe, and said cable to said structural member of said building and avoid interference with said existing objects.

2. The beam clamp according to claim 1, wherein the first end comprises a gap configured to fit over at least one of a web of said structural member of said building and a flange of said structural member of said building, and clamp onto said at least one of said web of said structural member of said building and said flange of said structural member of said building.

3. The beam clamp according to claim 2, wherein:
   said first end comprises a spiral wound metal strap configured to form said gap and fit over said at least one of said web of said structural member of said building and said flange of said structural member of said building, and clamp onto said at least one of said web of said structural member of said building and said flange of said structural member of said building, wherein (i) the spiral wound metal strap comprises a first end, a second end, a first central facet, and a second central facet, (ii) the first end of the spiral wound metal strap overlaps and is juxtaposed with the second end of the spiral wound metal strap, (iii) the first central facet of the spiral wound metal strap and the second central facet of the spiral wound metal strap are at an angle to the first end of the spiral wound metal strap and the second end of the spiral wound metal strap, and to one another, and (iv) at least one of the first central facet of the spiral wound metal strap and the second central facet of the spiral wound metal strap comprise a threaded feature positioned on an opposite side of the first end of the beam clamp from the overlapping of the first end of the spiral wound metal strap and the second end of the spiral wound metal strap; and said second end comprises a threaded shaft comprising a first end configured to thread into said threaded feature of said spiral wound metal strap and a second end configured to attach to the clamp device configured to support said at least one of said conduit, said pipe, and said cable.

4. The beam clamp according to claim 2, wherein said beam clamp further comprises:

a first beam member comprising a first end, a first central portion, and a second end;

a second beam member comprising a third end, a second central portion, and a fourth end; and a first fastener and a first nut, wherein (i) the first end of the first beam member and the third end of the second beam member are bent at a first angle to the first central portion of the first beam member and the second central portion of the second beam member, respectively, (ii) the third end of said second beam member is configured to cooperate with the first end of said first beam member to form said gap, (iii) the first central portion and the second central portion each define openings through which the first fastener is passed and secured by the first nut, (iv) the openings defined by the first central portion and the second central portion are elongated to allow adjustment of the first beam member and the second beam member relative to each other, (v) said first fastener and said first nut are configured to draw said first beam member and said second beam member together to narrow said gap to apply a clamping force to clamp said beam clamp on said structural member of said building, (vi) the second end of the first beam member and the fourth end of the second beam member are bent at a second angle relative to the first central portion and the second central portion, respectively, and (vii) the second end of the first beam member and the fourth end of the second beam member are generally bent in a direction opposite to the first end of the first beam member and the third end of the second beam member, respectively.

5. The beam clamp according to claim 4, wherein said first end of said first beam member and said third end of said second beam member are configured such that said beam clamp extends at said angle from said structural member of said building.

6. The beam clamp according to claim 4, wherein said beam clamp further comprises:

a second fastener; and a second nut, wherein said second fastener and said second nut are configured to attach said clamp device to the second end of said first beam member and the fourth end of said second beam member.

7. The beam clamp according to claim 2, wherein said beam clamp further comprises:

a folded beam member, wherein (i) a first end of said folded beam member and a second end of said folded beam member are configured to form said gap, (ii) said first end of said folded beam member and said second end of said folded beam member are configured to apply a clamping force to clamp said beam clamp on said structural member of said building, (iii) said first end of said folded beam member and said second end of said folded beam member are configured to spread apart when the folded beam member is pushed onto said structural member of said building, and (iv) a center section of said folded beam member comprises a threaded hole into which a fastener can be screwed.

8. The beam clamp according to claim 7, wherein a center section of said folded beam member is configured to enable the clamp device configured to support said at least one of said conduit, said pipe, and said cable to be attached to said center section of said folded beam member by the fastener.

9. The beam clamp according to claim 2, wherein said beam clamp further comprises:

an F-shaped clamp comprising a first clamping feature, a second clamping feature, a third clamping feature, a tang, and a threaded feature, wherein the F-shaped beam clamp is configured to be pushed onto said structural member of said building; and a threaded shaft, wherein said first clamping feature, said second clamping feature, and said third clamping feature form said gap, said first clamping feature, said second clamping feature, and said third clamping feature are configured to apply a clamping force to clamp said beam clamp on said structural member of said building, and a first end of said threaded shaft is threaded into said threaded feature and a second end of said threaded shaft is configured to attach to the clamp device configured to support said at least one of said conduit, said pipe, and said cable.

10. The beam clamp according to claim 9, wherein said first clamping feature said second clamping feature, and said third clamping feature comprise a plurality of barbs configured to grip said structural member of said building.

11. The beam clamp according to claim 9, wherein said threaded shaft comprises a bolt.

12. A system for supporting and securing a utility conduit to a structural member of a building comprising:

a first end configured to grasp a structural member of the building; and a second end configured to allow attachment of a clamp device configured to grasp at least one of a conduit, a pipe, and a cable, wherein said beam clamp is configured to be inserted around existing objects attached to said structural member of said building, extend at an angle through said existing objects, and enable attaching said at least one of said conduit, said pipe, and said cable to said structural member of said building and avoid interference with said existing objects.

13. The system according to claim 12, wherein the first end comprises a gap configured to fit over at least one of a web of said structural member of said building and a flange of said structural member of said building, and clamp onto said at least one of said web of said structural member of said building and said flange of said structural member of said building.

14. The system according to claim 13, wherein:

said first end comprises a spiral wound metal strap configured to form said gap and fit over said at least one of said web of said structural member of said building and said flange of said structural member of said building, and clamp onto said at least one of said web of said structural member of said building and said flange of said structural member of said building, wherein (i) the spiral wound metal strap comprises a first end, a second end, a first central facet, and a second central facet, (ii) the first end of the spiral wound metal strap overlaps and is juxtaposed with the second end of the spiral wound metal strap, (iii) the first central facet of the spiral wound metal strap and the second central facet of the spiral wound metal strap are at an angle to the first end of the spiral wound metal strap and the second end of the spiral wound metal strap, and to one another, and (iv) at least one of the first central facet of the spiral wound metal strap and the second central facet of the spiral wound metal strap comprise a threaded feature positioned on an opposite side of the first end of the beam clamp from the overlapping of the first end of the spiral wound metal strap and the second end of the spiral wound metal strap; and said second end comprises a threaded shaft comprising a first end configured to thread into said threaded feature of said spiral wound metal strap and a second end configured to attach to the clamp device configured to support said at least one of said conduit, said pipe, and said cable.

15. The system according to claim 13, wherein said system further comprises:

a first beam member comprising a first end, a first central portion, and a second end;

a second beam member comprising a third end, a second central portion, and a fourth end; and a first fastener and a first nut, wherein (i) the first end of the first beam member and the third end of the second beam member are bent at a first angle to the first central portion of the first beam member and the second central portion of the second beam member, respectively, (ii) the third end of said second beam member is configured to cooperate with the first end of said first beam member to form said gap, (iii) the first central portion and the second central portion each define openings through which the first fastener is passed and secured by the first nut, (iv) the openings defined by the first central portion and the second central portion are elongated to allow adjustment of the first beam member and the second beam member relative to each other, (v) said first fastener and said first nut are configured to draw said first beam member and said second beam member together to narrow said gap to apply a clamping force to clamp said beam clamp on said structural member of said building, (vi) the second end of the first beam member and the fourth end of the second beam member are bent at a second angle relative to the first central portion and the second central portion, respectively, and (vii) the second end of the first beam member and the fourth end of the second beam member are generally bent in a direction opposite to the first end of the first beam member and the third end of the second beam member, respectively.

16. The system according to claim 15, wherein said first end of said first beam member and said third end of said second beam member are configured such that said beam clamp extends at said angle from said structural member of said building.

17. The system according to claim 15, wherein said system further comprises:

a second fastener; and a second nut, wherein said second fastener and said second nut are configured to attach said clamp device to the second end of said first beam member and the fourth end of said second beam member.

18. The system according to claim 13, wherein said system further comprises:

a folded beam member, wherein (i) a first end of said folded beam member and a second end of said folded beam member are configured to form said gap, (ii) said first end of said folded beam member and said second end of said folded beam member are configured to apply a clamping force to clamp said beam clamp on said structural member of said building, (iii) said first end of said folded beam member and said second end of said folded beam member are configured to spread apart when the folded beam member is pushed onto said structural member of said building, and (iv) a center section of said folded beam member comprises a threaded hole into which a fastener can be screwed.

19. The system according to claim 18, wherein a center section of said folded beam member is configured to enable the clamp device configured to support said at least one of said conduit, said pipe, and said cable to be attached to said center section of said folded beam member by the fastener.

20. A method for supporting and securing a utility conduit to a structural member of a building, comprising:

attaching a beam clamp to the structural member of the building, wherein said beam clamp comprises a first end configured to grasp the structural member of the building and a second end configured to allow attachment of a clamp device configured to grasp at least one of a conduit, a pipe, and a cable;

attaching the clamp device to the second end of the beam clamp; and attaching at least one of a conduit, a pipe, and a cable to the clamp device, wherein said beam clamp is configured to be inserted around existing objects attached to said structural member of said building, extend at an angle through said existing objects, and enable attaching said at least one of said conduit, said pipe, and said cable to said structural member of said building and avoid interference with said existing objects.

* * * * *